United States Patent [19]

Merrill

[11] Patent Number: 4,501,663
[45] Date of Patent: Feb. 26, 1985

[54] FILTER CARTRIDGES AND METHODS AND COMPONENTS FOR MAKING THEM

[75] Inventor: Wayne S. Merrill, Litchfield, N.H.

[73] Assignee: Millipore Corporation, Bedford, Mass.

[21] Appl. No.: 286,420

[22] Filed: Jul. 24, 1981

Related U.S. Application Data

[63] Continuation of Ser. No. 091,626, Nov. 5, 1979, abandoned.

[51] Int. Cl.³ ............................................. B01D 31/00
[52] U.S. Cl. ................................. 210/347; 210/433.2; 264/257
[58] Field of Search ............... 210/347, 445, 486, 490, 210/321.1, 433.2; 264/257

[56] References Cited

U.S. PATENT DOCUMENTS

| | | | |
|---|---|---|---|
| 3,259,248 | 2/1966 | Wiegand | 210/347 X |
| 3,398,833 | 8/1968 | Marks et al. | 210/347 X |
| 3,494,470 | 2/1970 | Banfield | 210/490 X |
| 3,730,353 | 5/1973 | Trasen et al. | 210/486 X |
| 4,187,182 | 2/1980 | Rosenberg | 210/445 |
| 4,265,762 | 5/1981 | Brenholt | 210/321.1 |

*Primary Examiner*—Frank Spear
*Attorney, Agent, or Firm*—Andrew T. Karnakis

[57] ABSTRACT

Novel membrane filter units are disclosed which are adapted for stacking and bonding into integral, disposable cartridges, optionally including an integral disposable housing. The units comprise a thin plastic support having flat membranes permanently bonded to their upper and lower surfaces. The support has a central opening, a sealing rim, and on each surface, inner and outer circumferential lands and intervening ribs or similar projections, the membranes being bonded and sealed to the lands and ribs. Each support surface adjacent the central opening has circumferential coupling and spacing means for bonding stacked units together in spaced relation. A novel method for bonding a membrane to a support is also disclosed.

18 Claims, 17 Drawing Figures

FILTER CARTRIDGES AND METHODS AND COMPONENTS FOR MAKING THEM

This application is a continuation of application Ser. No. 091,626, filed Nov. 5, 1979, now abandoned.

BACKGROUND OF THE INVENTION

This invention relates to filtration and more particularly to membrane filter cartridges and to components and methods for making them.

Membrane filters of various polymeric materials are known and are generally thin porous structures having porosities between about 50–80% by volume. They are relatively fragile and are commonly used with various types of mechanical support or reinforcement. Flow rates of liquids through such membranes per unit of area are a function of pore size, flow rates decreasing with decreasing pore size. To obtain high flow rates through filters with fine pores, for example below about one micron, relatively large filter areas are needed. Such areas have therefore been provided by using large individual filters or by using a number of smaller individual filters in parallel. For use in critical applications such as sterilization, such membranes and their supporting apparatus must be free of leaks or defects capable of passing small particles or organisms.

Numbers of small filters have heretofore been hand-assembled for parallel flow with supporting plates and associated apparatus, then tested, and, if necessary, sterilized, often at the user's site at considerable cost and inconvenience. The operations must be repeated if the hand assembly fails the necessary tests. The mechanical parts are generally cleaned and re-used, only the filters being replaced. One assembly heretofore provided in disposable plastic has also been mechanically secured with relatively moveable parts.

Individual membrane filters of large area have been supported flat or cylindrically, or have been pleated for disposition in compact housings. Holders for flat membranes are large, for a given filter area, are usually not disposable, and also require disassembly, cleaning, reassembly and testing with each change of filter. Pleating of fragile membranes creates stress concentrations at the folds, permits flexing of the fragile membranes in use, normally requires interleaving flow screens on one or both of the upstream and downstream sides, requires potting and adhesives to seal the ends and overlapping seams, and requires considerable hand operation. Because of concern for possible failures at the folds, seams, or ends, a separate flat final filter is sometimes used in series with pleated cartridges for added assurance in critical applications, for example, in sterilizing pharmaceuticals and intravenous fluids. In addition, the use of a number of different materials in pleated cartridge construction increases the sources for extractibles into the filtrate.

SUMMARY OF THE INVENTION

Principal objects of the present invention include the provision of novel membrane filter cartridges, novel components for use therein, and a novel procedure for bonding and sealing a membrane filter to a support. Further objects include provision of novel filter cartridges which are disposable, which avoid membrane folding, which are easy to automate for economical manufacture and easy to test for integrity, which use a minimum number of materials, and which are easy to provide in a variety of sizes using common parts. Other and additional objects and advantages will be apparent from the following more detailed description.

In one aspect, the present invention provides a filter unit adapted for bonding with similar units into disposable stacks, said unit having a central opening adapted for axial liquid flow therethrough and comprising a thin support having a porous membrane secured to its upper and lower surfaces, each of said surfaces having inner and outer circumferential lands and intervening ribs defining substantially a common plane, the membrane being permanently sealed to the surface of said lands and ribs in said plane, each support surface between the inner land and central opening having coupling means adapted for bonding to complimentary coupling means of a superposed filter unit, the coupling means on at least one surface extending beyond the surface of the adjacent membrane, said support having internal passageways for liquid between said membranes and said central opening, said opening and passageways providing the only liquid paths through the unit. Preferably the support is of plastic material and the membranes are mechanically bonded thereto by imbibing solvated material from the support into the membrane pores as hereinafter described.

The support structure may be made in any suitable manner in one or more pieces. If the support comprises a single piece, preferably the inner land and coupling means of one support surface are offset from the inner land and coupling means of the other surface from the axis of the central opening, the inner passageways of the support terminating within the offset between them. Where the support comprises two or more parts, they are preferably welded together to form a unitary structure of a single material and one of the pieces contains both outer lands joined together liquid-tight to avoid leakage.

In a second aspect of the present invention, a disposable filter cartridge is provided which comprises a stack of filter units as described above integrally bonded together, liquid-tight, at said coupling means to provide a central, axial flow channel, the channel being sealed against liquid flow at one end and having connecting means bonded to the other end for connection to a liquid conduit, the bonded coupling means spacing adjacent membranes apart to define a flow channel therebetween external to the units. Preferably the units have supports of the same plastic material and are bonded together at their coupling means by heat or solvent welding. The cartridges can be used in conventional cartridge housings having an inlet and outlet for liquids communicating respectively with the periphery and central opening of the cartridge. The normal flow path for liquids through the cartridge is thus from the periphery, between the membranes of adjacent filter units, through the membranes and internal passageways, to the central opening. Reverse flow at somewhat reduced pressures is also possible since the membranes are bonded to the intervening support ribs, as well as the marginal lands, and are well supported against back pressure.

Alternatively, the filter cartridges may be mounted and sealed in their own disposable housings which may comprise end caps and a central spacer, the end caps providing liquid inlet and outlet to the cartridge. The end caps may be identical and the number of filter units in the cartridge may be varied merely by changing the height of the central spacer. Preferably, the end caps and spacer of the housing are of the same plastic as the filter unit supports and are also joined and sealed by welding. By this means only two materials are used, the plastic material of the support and housing, and the material of the membrane. No adhesives, potting compounds, o-rings or the like are required, thereby minimizing extractibles and mechanical stresses from thermal expansion and contraction.

In a third aspect, the present invention comprises a novel and advantageous method for sealing a microporous filter to the margins and to the intervening ribs or the like of a support. The method is reliable and reproducible, readily automated, and minimizes damage to the filter and occlusion of its filter volume. The method comprises using a support of a plastic material different fron the filter material, absorbing into the pores of the filter a predetermined amount of a solvent for the support material which is a non-solvent for the filter, contacting the support with the wetted filter, maintaining contact for a time sufficient to solvate the surface material of the support and wick a portion thereof into the pores of the filter, and removing the solvent, preferably by drying. Preferably the filter pores are filled with solvent, without substantial surface excess. Conveniently, the filter can be saturated with excess solvent and spun to remove the excess. Only minimum contact pressure between support and filter is required which avoids mechanical damage to the membrane.

The structure of the resulting filter and support is believed to be different from and superior to structures obtained with prior techniques whereby heat, solvent or adhesive is applied to the support. By the present method, support plastic is wicked or imbibed only into the membrane pores over the ribs or the like, without significant lateral spread which occludes filter area. Indeed, the imbibed plastic need not, and normally does not, extend through the membrane, thereby leaving portions over the ribs, remote therefrom, with oblique channels through the membrane. Experience to date, for example, indicate that for a given fluid, pressure and support structure, the present procedure reduces flow rate by only about 15%. The ribs preferably have a curved surface to minimize contact.

The new bonding procedure is applicable to any support structure having fine support features as shown for example in U.S. Pat. Nos. 3,854,907; 3,730,353; and 3,471,019. Heretofore, fine ribbed or dimpled supports have not been bonded to the filters for reasons of occlusion, control and the like. Bonding by the procedure herein described is practical and can provide significant back-flow protection against pressure surges and, in some cases, can obviate the need for check valves. The present technique can also be conveniently applied to laminate membranes to plastic fibrous supports such as woven cloth or non-woven felts and spun-bonded filaments for reinforcement.

DETAILED DESCRIPTION OF THE INVENTION

The present invention may be better understood by reference to the following detailed description and to the accompanying drawings in which.

Figure 1:
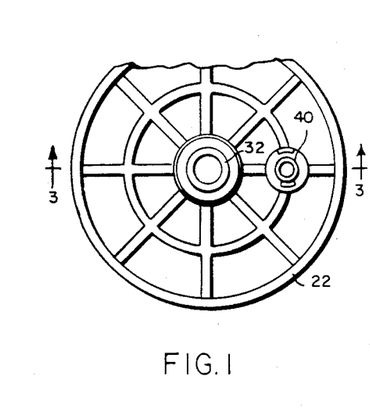
FIG. 1 is a plan view of a filter cartridge according to the present invention.
Figure 2:
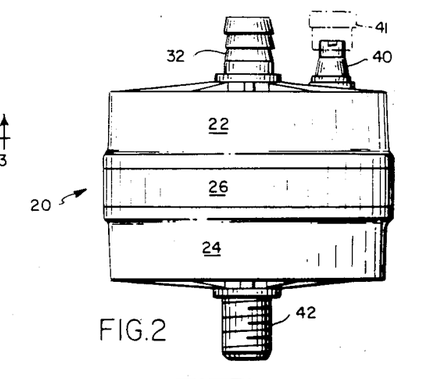
FIG. 2 is a side view of the cartridge shown in FIG. 1.
Figure 3:
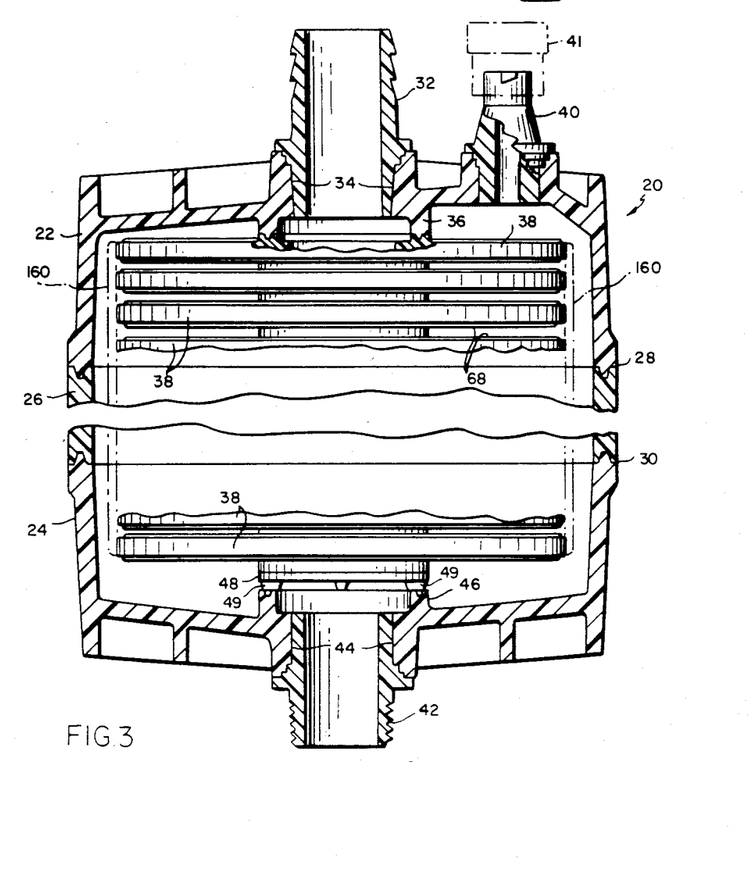
FIG. 3 is a vertical diametric section through the cartridge shown in FIGS. 1 and 2.

Referring to the drawings, a self-contained filter cartridge having, for example, 500 square centimeters of filter area, is shown in FIGS. 1–3. The cartridge comprises a housing 20 having an upper end cap 22, a lower end cap 24 and a spacer sleeve 26 therebetween. Preferably the end caps 22 and 24 and the spacer 26 are of the same plastic material and are welded together with heat or solvent at 28 and 30, end caps 22 and 24 having a marginal tongue, and spacer 26 having complementary grooves. End cap 22 is provided with a fitting 32 adapted for connection to an outlet conduit of tubing or the like which is welded to the end cap at the weld lines 34. Beneath the fitting 34, end cap 22 has a concentric ring 36 for bonding to a filter unit 38 as more fully hereinafter described. Ring 36 and the fitting 32 comprise connecting means for connecting a stack of filter units or discs 38 within the housing 20 to an outlet conduit (not shown).

A vent 40 of any suitable type is provided in the end cap 22 to permit the venting of air from the housing at start-up. This may comprise, for example, a manually opening valve which is opened to exhaust air and thereafter closed. Vent 40 is provided with a removable cap 41.

End cap 24 is similar to the end cap 22 and is provided with an inlet 42 bonded thereto at the weld line 44. If desired, end cap 24 may be provided with a vent 40 and is otherwise identical to the cap 22. A vent at each end of the housing permits use of the cartridge with either end uppermost. End cap 24 has a ring 46 similar to the ring 36. However, ring 36 is not bonded to the internal stack of filter discs 38. Instead, the lowermost disc 38 is sealed with an end cap 48 provided with external ribs 49 or the like resting on the inner periphery of ring 46 to prevent sealing against inlet flow.

In use, a liquid to be filtered enters inlet 42, passes around the outer periphery of the stack of filter units 38, enters the spaces between the units, passes through the filters to a central channel within the stack, as hereinafter described, from which the filtrate passes out fitting 32 to the exit conduit.

One embodiment of the filter unit 38 is shown in FIGS. 4–13 comprising two interfitting parts 50 and 52. Part 50 comprises a flat disc portion 54 (FIG. 13) which carries concentric upstanding ribs 56 and is provided with radial cutaway channels 58 beneath the ribs 56. Part 50 also has integral with the base 54 a solid rim 60 which has upper and lower flat lands 62 and 64. Part 50 is also provided with an inner circumferential land 66. Inner land 66 and outer land 64 together with the surfaces of the intervening ribs 56 define a common plane to which a membrane filter 68 is bonded as hereinafter described.

Figure 4:
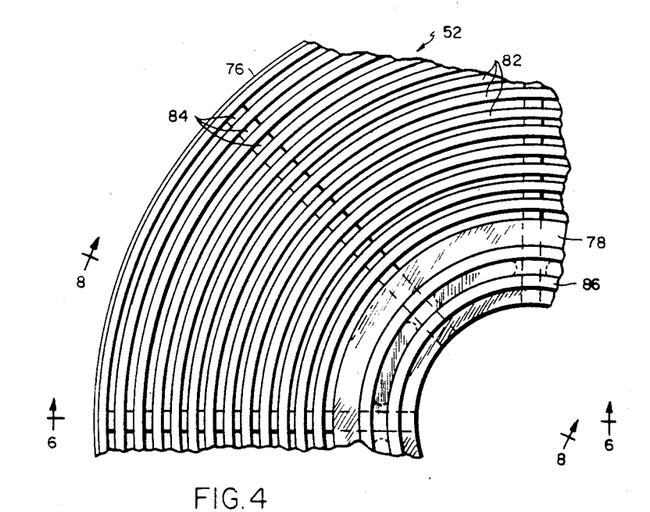
FIG. 4 is a partial plan view to enlarged scale of one part of a two part filter support according to the invention.
Figure 5:
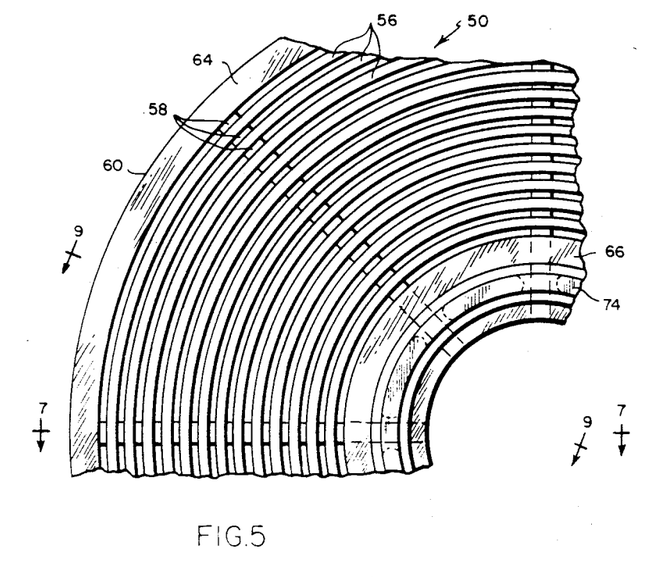
FIG. 5 is a partial plan view similar to FIG. 4 showing the second part of the two part support.
Figure 6:
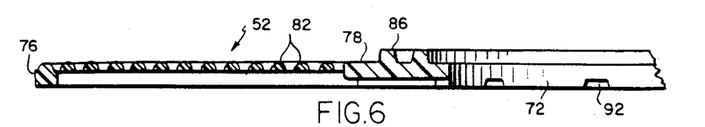
FIG. 6 is a section on the line 6—6 of FIG. 4.
Figure 7:
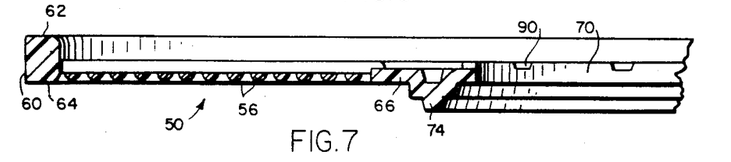
FIG. 7 is a section on the line 7—7 of FIG. 5.
Figure 8:
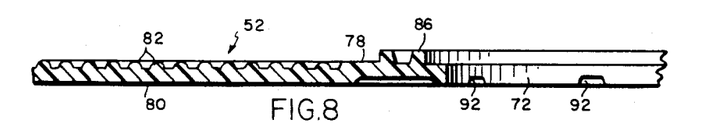
FIG. 8 is a section on the line 8—8 of FIG. 4.
Figure 9:
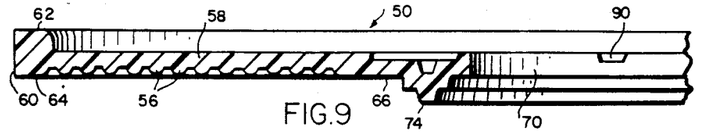
FIG. 9 is a section on the line 9—9 of FIG. 5.

Both parts 50 and 52 have a central opening 70 and 72 respectively which are adapted for axial flow of liquid therethrough. Between the edge of opening 70 and the inner circumferential land 66, part 50 has upstanding circumferential coupling means 74 adapted for permanent bonding to the complementary coupling of a superposed filter unit 38 to lock the two units together and space their adjacent filters 68 apart so that liquid may flow between them. Coupling 74 may have a surface of any desired configuration, but conveniently as shown is provided with an upstanding tongue on its surface.

Figure 10:
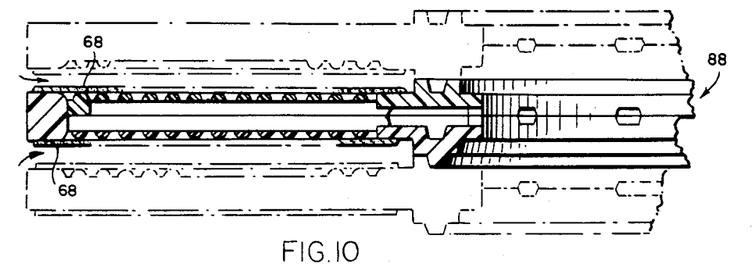
FIG. 10 is a section similar to FIGS. 6 and 7 showing the two parts assembled, together with superposed filter units shown in broken lines.
Figure 11:
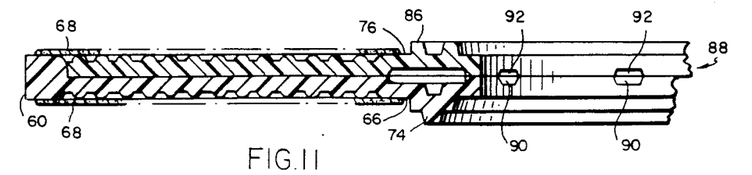
FIG. 11 is a section similar to FIGS. 8 and 9 showing the two support parts assembled.
Figure 12:
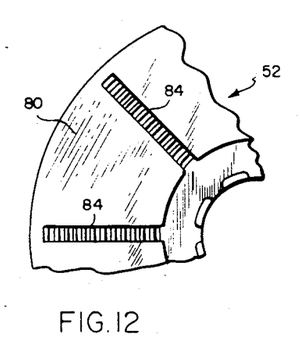
FIG. 12 is a partial plan view, to reduced scale, showing the reverse side of the support part shown in FIG. 4.
Figure 13:
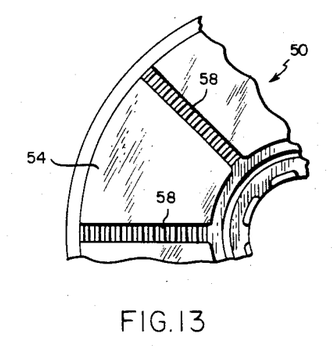
FIG. 13 is a partial plan, to reduced scale, of the reverse side of the part shown in FIG. 5.

The part 52 fits within the part 50 as shown in FIGS. 10 and 11 and is bonded permanently thereto to make a unitary support for filters 68 bonded to its upper and lower surface. Part 52 has a flat central portion 80 (FIG. 12) similar to the portion 54 of the part 50 and is also provided with upstanding ribs 82 and radial channels 84 which are bridged by the ribs 82. The part 52 has an outer rim 76 which fits within the interior of the rim 60 of the part 50 inside the land 62. The part 52 has an inner circumferential land 78 which, when assembled with the part 50 as shown in FIGS. 10 and 11, defines a common plane with the land 62 and the surfaces of the ribs 82. Between the opening 72 and the land 78, the part 52 is provided with upstanding coupling means 86 which as shown has a groove complementary to the tongue of the coupling means 74 of part 50.

When the parts 50 and 52 are assembled and bonded together, preferably by welding with heat or solvent, a unitary support 88 for membrane filters 68 is provided. The membranes 68, one on each of the upper or lower end lower surfaces of the support 88, are permanently bonded to the lands 66 and 64 and the tops of ribs 56, and the lands 62 and 78 and to the surfaces of ribs 82.

As illustrated in FIG. 10, the completed filter unit 88 has a hub about the opening 70–72 comprising the coupling means 74 on one side and the coupling means 86 on the other, one being complementary to the other. As shown in FIG. 10 in broken lines, like filter units 38 are superimposed and bonded at their coupling means, preferably by solvent welding. The filter units 38, comprising a completed support 88 and the two filter membranes 68, may be bonded into stacks of any desired height and secured within the housing 20 as shown in FIG. 3. The size of the cartridge can be varied by varying the number of units 38 included, and by varying the height of spacer 26.

The channels 58 and 84 of parts 50 and 52, respectively, terminate in openings 90 and 92 at the central openings 70 and 72, respectively, of the parts 50 and 52. In assembling the part 52 within the part 50, the channels 58 and 84 may be aligned, which will provide alignment for the openings 90 and 92, but such alignment is not required. The space between the ribs 56 and 82 provide arcuate channels by which liquid passing through the filters 68 may flow to the radial channels 58 and 84 and then through the openings 80 and 82 into the central opening 70–72 of the filter element 38. Such spaces between the ribs and radial channels provide internal passageways for liquid flowing through the membrane filters 68 to the central opening 70–72, from which filtrate flows axially to the fitting 32 and to an outlet conduit.

Preferably all parts of the cartridge shown in FIGS. 1–3, other than the membrane filters 68, are of a common plastic material, for example polycarbonate, and are welded together into a rigid unitary structure by means of heat or solvent. The resulting cartridge can be sterilized and used in an in-line filtering application, discarded, and readily replaced with a minimum of downtime, labor and inconvenience. While adhesive or other permanent bonding means can be employed to assemble the parts of the cartridge, welding as described is preferred and can be accomplished by automated operations. A cartridge thus assembled will consist of but two materials, the plastic comprising the housing and filter supports, and the material from which the membrane is made. This minimum number of materials not only decreases the cost and operations involved, but also minimizes extractable materials.

The membranes 68 are microporous cast films or bonded or matted fibers, preferably pores less than about 25 microns in size. Such membranes and methods for making them from a variety of polymeric materials are known. By being supported flat, without folds, and by being bonded to support ribs intermediate their peripheral margins, the membranes are well anchored against flow in either direction and are not subject to the stresses of folding or of flexing during use.

The membranes 68 may be bonded to the supports 88 in any desired manner. However, it is preferred according to the present invention that they be bonded by the following procedure. A predetermined amount of a solvent for the plastic material of support 88, which is a non-solvent for the membrane, is absorbed into the membrane pores. The membrane is lightly pressed on the lands and rib surfaces of the support. The solvent solvates the plastic material, preferably a thermoplastic, of the support and wicks portions thereof into the membrane pores lying above the surfaces of the lands and ribs, but not substantially into the flow passages between the ribs, thereby providing firm anchorage with a minimum of occlusion of filter volume. A predetermined amount of solvent can be premeasured and applied, and will spread throughout the membrane by capillarity. Preferably, however, it has been found convenient to spin the membrane, to apply excess solvent to the membrane, and to remove the excess by the centrifugal force. This procedure substantially saturated the membrane pores, without excess, and is readily automated. After light contact sufficient to wick plastic into the membrane pores, the membrane is dried. This has not been found to be a critical operation and normal air drying after a dwell time of 60 seconds or less has been found suitable. For the preferred materials, a dwell time of three seconds is sufficient. Any suitable solvent with a plastic comprising support 88 may be used.

Careful testing has established that the above bonding procedure effectively bonds the membrane liquid-tight against flow of liquid except through the membrane. It has also shown that the area of the membrane occluded from the flow of liquid is substantially less than is the case when other bonding techniques are used, for example by applying the solvent directly to the support plastic of by the use of heat and pressure. The resulting bond is believed to be at least partly mechanical, cross-sections of such membranes having shown extensions of support material filling the pore portions adjacent to the support.

In the embodiment currently preferred, the support 88 and housing 20 are of polycarbonate, and the membrane 68 is of cast polyvinylidene fluoride. The membrane is solvent welded to its support, the filter units welded together at their coupling means, and the housing parts are solvent welded together, with trichloroethylene as solvent. The fittings to end caps 22 and 24 are prewelded ultrasonically with heat. Other suitable materials may be used.

Figure 14:
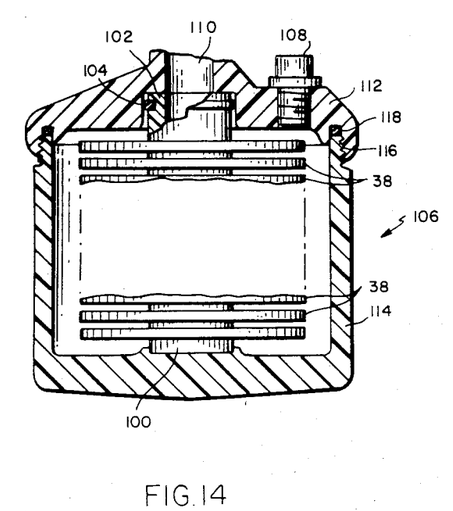
FIG. 14 is a diametric vertical section similar to FIG. 3 showing a cartridge according to the present invention mounted in a conventional, re-usable cartridge holder.

An alternative filter cartridge of stacked discs 38 is shown in FIG. 14 disposed in a reusable cartridge holder 106 of conventional design. The cartridge comprises a plurality of filter units 38 bonded together at their coupling means to form a central axial flow channel which is closed at its lower end by a bonded cap 100. The upper end of the central flow channel is provided with connecter means 102 comprising a hollow cylinder fitted with an O-ring seal 104. The holder 106 comprises a cap 112 having an inlet 108 admitting liquid to the periphery of filter units 38 and an outlet 110, and a base 114. As shown, base 114 and cap 112 have interfitting threads 116 which seal against an O-ring 118. Any other suitable sealing means can be employed. For the sterilization of fluids, a conventional stainless steel housing with a sealing gasket and external clamp is preferred. Cap 112 is recessed beneath the inlet 110 for receiving the connector means 102, the walls of the recess cooperating with the O-ring 104 to provide a liquid seal.

Figure 15:
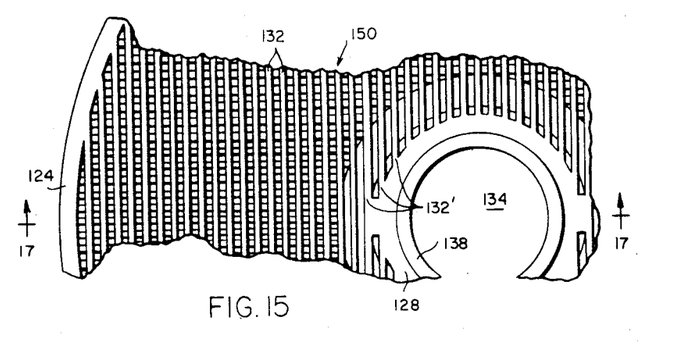
FIG. 15 is a partial plan view illustrating an alternative one-piece filter support.
Figure 16:
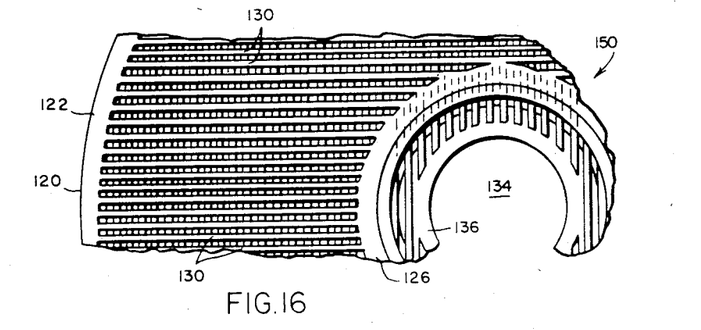
FIG. 16 is a partial plan view of the reverse side of the support shown in FIG. 15.
Figure 17:
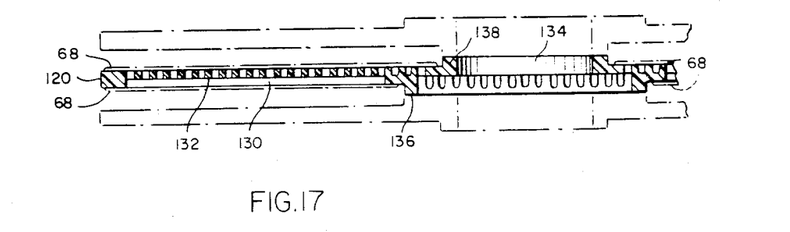
FIG. 17 is a partial section on the line 17—17 of FIG. 15.

An alternative one-piece support 150 for a filter unit according to the present invention is shown in FIGS. 15-17. In this embodiment the disc has a rim 120 at its outer circumference provided with lands 122 and 124 on its upper and lower surface. Inner circumferential lands 126 and 128 are provided which define with the outer circumferential lands 122 and 124, respectively, common planes to which membrane filters are bonded as previously described. Intermediate the lands 122 and 126, ribs 130 are provided. Similarly, ribs 132 are provided intermediate the inner and outer lands 124 and 128 on the opposite surface of the support. Ribs 130 and 132 are regularly spaced across the support surface and intersect, preferably at an angle of 90 degrees, providing a gridded structure through which liquids can flow.

Inner circumferential land 128 is radially offset and lies within the land 126, the ribs 131 extending across the gap between them to provide structural support and liquid passageways into the central opening 134. Coupling means 136 and 138 are provided, respectively, between the central opening 134 and the land 126 and the land 128. As shown, coupling means 136 and 138 have substantially flat outer surfaces which extend beyond the surface of the membranes bonded adjacent thereto. The support discs may be stacked alternately right side up and upside down with the coupling means 136 of adjacent discs in contact for permanent bonding and with the coupling means 138 bonded to coupling means 138 of another superposed disc. Alternatively, two sets of support discs may be provided which are identical except that one disc has coupling means provided with a tongue and the other disc having coupling means provided with a complementary groove. The alternative support shown in FIGS. 15-17 may be bonded in stacks to form a central flow channel and housed in its own disposable housing or in a conventional reusable housing as previously described.

While the coupling means on the surfaces of the units 38 and the supports 150 may conveniently extend each from the surface of the disc above the adjacent membrane to provide spacing between adjacent discs, one of them can provide all or a majority of the required height and spacing.

While the filter supports are herein described for convenience and clarity as being round and having inner and outer circumferential lands, the supports may have any other convenient shape, oval or polygonal, and such shapes are intended to be included in the terms herein used. Similarly, while the central flow opening and cartridge channel is preferably round and axially located, the opening may be off center and of other shapes if desired. Also, the term "ribs" as herein used is intended to include any fine support structure, continuous or discontinuous, useful for providing mechanical support to the membrane filter while providing flow paths for liquids passing through the filters. In addition to discontinuous or continuous ribs as shown, for example, aligned or randomly arranged upstanding dimples of any desired cross-section may be used.

The present invention is useful with fibrous or cast microporous and ultrafiltration membranes having a pore size less than about 25 microns, and particularly less than about 1 micron. It may be used as a prefilter or as a final filter for blood, bacteria or the like. It is especially useful as a sterilizing unit for liquids. When used as a final filter, prefilter materials can be included in the cartridge to protect the final membranes 68. Such coarse filters may be superposed over the membranes 68, or a cylinder of prefilter material can be bonded to the periphery of the stack of units 38 as shown in broken lines in FIG. 3 at 160. Cast microporous membrane filters are preferred.

As previously described, the three part integral housing shown in FIGS. 2-3 facilitates changes in cartridge size. If desired, however, spacer 26 can be omitted and the end caps of proper size can be provided with complimentary margins and be bound together directly.

It should be understood that the foregoing description is for the purpose of illustration and that the invention includes all equivalents and modifications within the scope of the appended claims.

What is claimed is:

1. The method of bonding a preformed filter to a support surface which comprises: adding a predetermined amount of solvent to the pores of the filter, said solvent being a solvent for the support surface but not the filter; contacting the support surface with the solvent containing filter, the contacting surface of the support comprising a plurality of ribs, the area between said ribs not in contact with the filter forming channels for the flow of liquid; maintaining contact with said ribs until said solvent solvates said rib and wicks a portion thereof into the contacting pores of said filter; and removing the solvent.

2. The method according to claim 1 wherein excess solvent is added to the filter to fill the pores, and the excess is removed by spinning the filter.

3. The method according to claim 1 wherein said wicked support surface extends into the contacting pores of the filter but not through the thickness of the filter.

4. A bonded filter unit made according to the method of claim 1 comprising a preformed filter and a preformed support surface comprised of a plurality of connected ribs, the area between said ribs not in contact with the filter forming channels for the flow of liquid.

5. A membrane filter unit adapted for bonding with similar units into an integrated stack comprising:
- a support having upper and lower surfaces and a central opening adapted for axial liquid flow therethrough, said surfaces comprising a plurality of lands and ribs, the area between said ribs forming channels for the flow of liquid through said support to said central opening;
- a porous membrane filter solvent bonded to the surfaces of said lands and said ribs of each support surface by the method of claim 1, the area of porous membrane between said ribs serving as the filtering area; and
- coupling means attached to each support surface adjacent to said central opening, said central coupling means being adapted for bonding the filter unit to a complimentary filter unit.

6. The method according to claim 1 wherein said support surface is formed using substantially rigid plastic having upstanding lands and intervening ribs for contacting marginal and intervening portions of the filter.

7. The method according to claim 6 wherein said ribs have a curved surface to minimize contact with and occlusion of the filter.

8. The method according to claim 1 or 2 wherein said support surface defines a substantially common plane.

9. A membrane filter unit adapted for bonding with similar units into integrated stacks comprising:
- a support having upper and lower surfaces and a central opening adapted for axial liquid flow therethrough, said surfaces comprising inner and outer circumferential lands and intervening ribs defining a substantially common plane, the area between said ribs forming channels for the flow of liquid into internal passages extending through said support to said central opening;
- a porous membrane filter solvent bonded to the surfaces of said lands and said ribs of each support surface by the method of claim 1, the area of porous membrane between said ribs serving as the filtering area; and
- coupling means attached to each support surface adjacent said central opening, said central coupling means being adapted for bonding the filter unit to a complimentary filter unit.

10. A filter unit according to claim 9 wherein said support comprises two pieces bonded together, each piece carrying the ribs, inner land and coupling means of one surface, one of said pieces carrying a sealed outer rim which includes the outer lands of both surfaces.

11. A filter unit according to claim 9 wherein said support is a one-piece plastic molding, the inner land and coupling means of one surface being within and spaced from the inner land and coupling means of the other surface, said internal passageways terminating in the space between respective inner lands.

12. A filter unit according to claim 11 wherein the ribs on one support surface extend across the space between the two inner lands, the gaps between the extended ribs forming a portion of the internal passageways communicating with the central opening.

13. A filter unit according to any of claim 9, 10 or 11 wherein said support is a plastic material different from said membrane, and wherein the membranes are bonded thereto by means of plastic material from the support extending into the pores of the membrane in contact with said lands and intervening ribs, the pores of the membranes between said ribs being substantially free of material from the support.

14. A disposable filter cartridge comprising a plurality of filter units according to any of claim 9, 10 or 11, the units being permanently bonded together at said coupling means in stacked relationship to provide a central axial flow channel for liquids, the central flow channel being sealed at one end and having connecting means permanently bonded to the other end for connection to a liquid conduit, said bonded coupling means spacing adjacent membranes apart to define a flow channel for liquid therebetween external to said units.

15. A disposable filter cartridge comprising a plurality of filter units according to any of claim 9, 10 or 11, the units being permanently bonded together at said coupling means in stacked relationship to provide a central axial flow channel for liquids, the central flow channel being sealed at one end and having connecting means permanently bonded to the other end for connection to a liquid conduit, said bonded coupling means spacing adjacent membranes apart to define a flow channel for liquid therebetween external to said units, said support comprising a plastic material different from the material of said membrane, said membranes being bonded to the support by means of support material extending into the pores of the membrane in contact with the lands and ribs of the support, the pores of the membranes between ribs being substantially free of support material.

16. A disposable filter cartridge comprising a plurality of filter units according to any of claim 9, 10 or 11, the units being permanently bonded together at said coupling means in stacked relationship to provide a central axial flow channel for liquids, the central flow channel being sealed at one end and having connecting means permanently bonded to the other end for connection to a liquid conduit, said bonded coupling means spacing adjacent membranes apart to define a flow channel for liquid therebetween external to said units, said support comprising plastic material different from the material of said membrane, said membranes being bonded to the support by means of support material extending into the pores of the membrane in contact with the lands and ribs of the support, the pores of the membranes between ribs being substantially free of support material, all parts of the cartridge other than the membranes being of a common plastic material, all of said parts being integrally welded together.

17. A disposable filter cartridge comprising a plurality of filter units according to any of claim 9, 10 or 11, the units being permanently bonded together at said coupling means in stacked relationship to provide a central axial flow channel for liquids, the central flow channel being sealed at one end and having connecting means permanently bonded to the other end for connection to a liquid conduit, said bonded coupling means spacing adjacent membranes apart to define a flow channel for liquid therebetween external to said units, said support comprising plastic material different from the material of said membrane, said membranes being bonded to the support by means of support material extending into the pores of the membrane in contact with the lands and ribs of the support, the pores of the membranes between ribs being substantially free of support material, said cartridge having membranes with pore sizes below about one micron and being adapted to sterilize liquids.

18. A disposable filter cartridge comprising a plurality of filter units according to any of claim 9, 10 or 11, the units being permanently bonded together at said coupling means in stacked relationship to provide a central axial flow channel for liquids, the central flow channel being sealed at one end and having connecting means permanently bonded to the other end for connection to a liquid conduit, said bonded coupling means spacing adjacent membranes apart to define a flow channel for liquid therebetween external to said units, said support comprising plastic material different from the material of said membrane, said membranes being bonded to the support by means of support material extending into the pores of the membrane in contact with the lands and ribs of the support, the pores of the membranes between ribs being substantially free of support material, said cartridge comprising a housing having a cap for each end and a spacer therebetween, said spacer having mating means for each end cap and being integrally welded thereto, one end cap at the sealed end of said central flow channel having an inlet for liquid, and the other end cap including said connecting means bonded to the other end of said central channel.

* * * * *